(12) United States Patent
Kasahara et al.

(10) Patent No.: US 12,540,916 B2
(45) Date of Patent: Feb. 3, 2026

(54) SYSTEM FOR INFERENCE OF MEASUREMENT TARGET DYNAMIC STATE USING REDOX POTENTIAL

(71) Applicant: CHITOSE LABORATORY CORP., Kanagawa (JP)

(72) Inventors: Ken Kasahara, Kanagawa (JP); Tomohiro Fujita, Kanagawa (JP); Nobuaki Shono, Kanagawa (JP); Katsunori Okada, Kanagawa (JP); Yuko Omori, Kanagawa (JP)

(73) Assignee: Chitose Laboratory Corp., Kanagawa (JP)

( * ) Notice: Subject to any disclaimer, the term of this patent is extended or adjusted under 35 U.S.C. 154(b) by 534 days.

(21) Appl. No.: 17/624,246

(22) PCT Filed: Aug. 31, 2020

(86) PCT No.: PCT/JP2020/032863
§ 371 (c)(1),
(2) Date: Dec. 30, 2021

(87) PCT Pub. No.: WO2021/049348
PCT Pub. Date: Mar. 18, 2021

(65) Prior Publication Data
US 2022/0357299 A1    Nov. 10, 2022

(30) Foreign Application Priority Data

Sep. 12, 2019 (JP) ................. 2019-166118

(51) Int. Cl.
*G01N 27/416* (2006.01)
*G01N 27/327* (2006.01)

(52) U.S. Cl.
CPC ..... *G01N 27/4168* (2013.01); *G01N 27/3277* (2013.01)

(58) Field of Classification Search
CPC ... C12M 41/28; G01N 27/27; G01N 27/3277; G01N 27/4168; G01N 33/18;
(Continued)

(56) References Cited

U.S. PATENT DOCUMENTS

| 10,018,585 | B2 | 7/2018 | Ishige et al. | |
| 2014/0367277 | A1* | 12/2014 | Crawford | E21B 47/00 205/789 |
| 2016/0054257 | A1 | 2/2016 | Ishige et al. | |

FOREIGN PATENT DOCUMENTS

| CN | 107202826 A | | 9/2017 | |
| GB | 2539224 A | * | 12/2016 | ........... A61B 5/1486 |

(Continued)

OTHER PUBLICATIONS

International Search Report of International Patent Application No. PCT/JP2020/032863 completed Sep. 10, 2020 and mailed Sep. 29, 2020 ( 5 pages).

(Continued)

*Primary Examiner* — Gurpreet Kaur
(74) *Attorney, Agent, or Firm* — Pyprus Pte Ltd; George Liu

(57) ABSTRACT

[Problem] To provide a system for inference of a measurement target dynamic state, the system being capable of providing not only information as to whether a culture solution is aerobic or anaerobic, but also data for determining a culture operation and for optimizing various conditions of the culture solution. [Solution] A system for inference of a measurement target dynamic state, comprising: a reference electrode; a first working electrode; a second working electrode of which at least the material or surface treatment is different from the first working electrode; a third working electrode of which at least the material or surface treatment is different from the first working electrode and the second working electrode; and an information storage unit which
(Continued)

receives first potential information relating to the redox potential between the reference electrode and the first working electrode, second potential information relating to the redox potential between the reference electrode and the second working electrode, and third potential information relating to the redox potential between the reference electrode and the third working electrode, and stores information including the first potential information, the second potential information, and the third potential information.

10 Claims, 3 Drawing Sheets

(58) Field of Classification Search
CPC ........... G01N 33/1806; G01N 33/1846; G01N 33/186; G01N 33/1866; H01M 8/16
See application file for complete search history.

(56) References Cited

FOREIGN PATENT DOCUMENTS

| | | |
|---|---|---|
| JP | 1993-52754 U | 7/1993 |
| JP | 2002-48753 A | 2/2002 |
| JP | 2003-181461 A | 7/2003 |
| JP | 2007-33344 A | 2/2007 |
| JP | 4614841 B2 | 1/2011 |
| JP | 2011223988 A | 11/2011 |
| JP | 2019-144208 A | 8/2019 |
| WO | WO2007070093 A2 | 6/2007 |

OTHER PUBLICATIONS

Written Opinion of International Patent Application No. PCT/JP2020/032863 completed Sep. 10, 2020 and mailed Sep. 29, 2020 ( 3 pages).
Office Action of Chinese Patent Application No. 202080044036.3 dated Jan. 31, 2024 ( 7 pages).
Luis Gil et al, Monitoring of physical-chemical and microbiological changes in fresh pork meat under cold storage by means of potentiometric electronic tongue, Food Chemistry, Nov. 17, 2010.
Examination Report of Indian Patent Application No. 202247014047 dated Sep. 19, 2022 ( 5 pages).
Notice of Deficiencies of Israel Patent Application No. 289070 dated Apr. 9, 2024 ( 4 pages).

* cited by examiner

[Fig. 1]
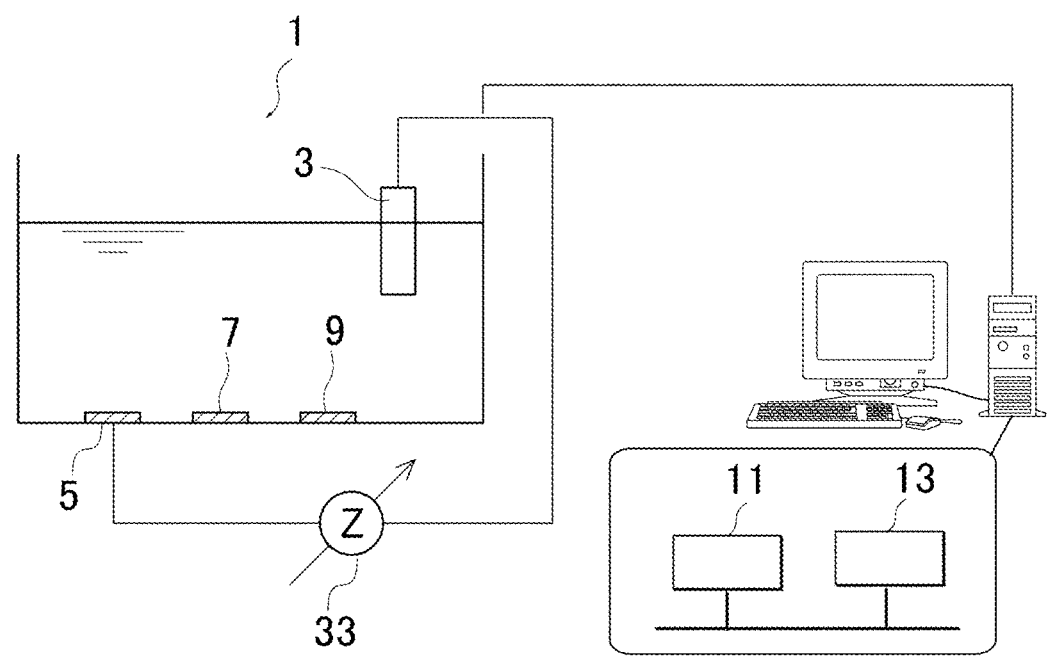
[Fig. 2]
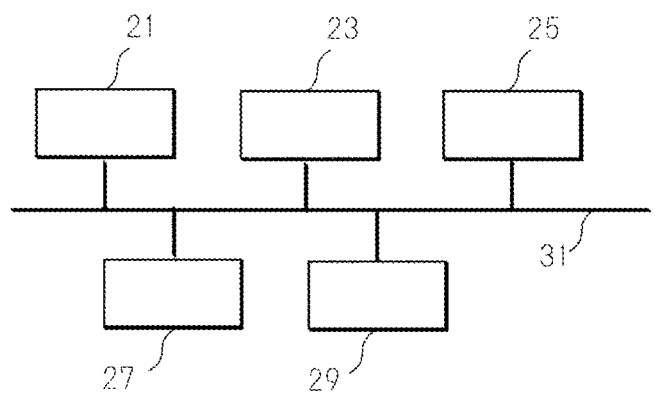

[Fig. 3]
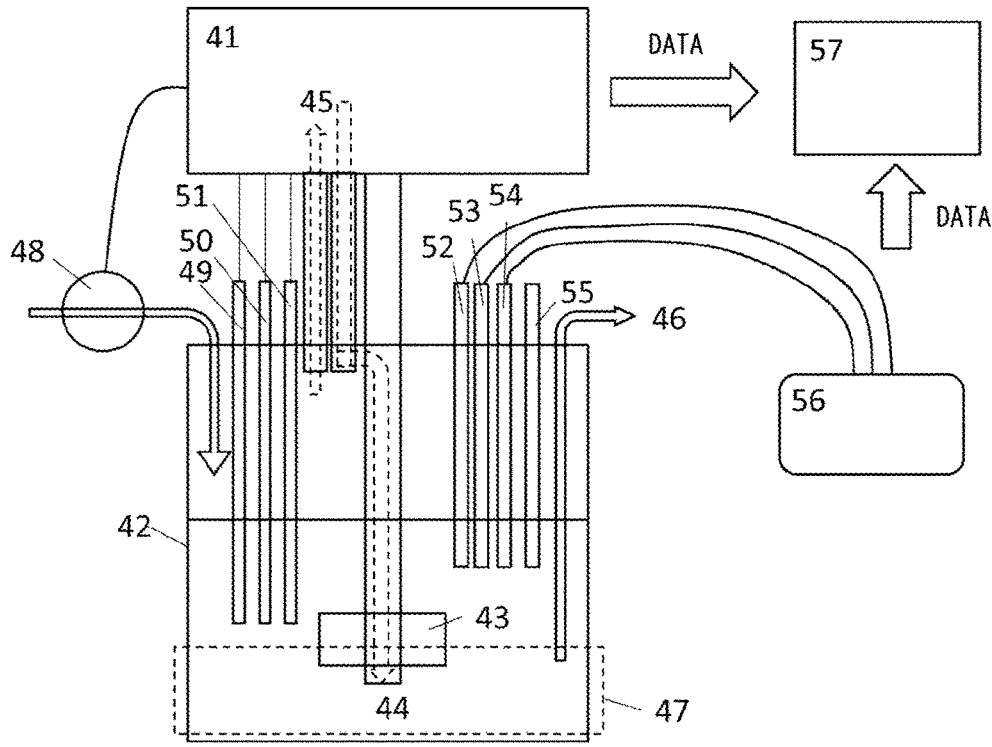
[Fig. 4]
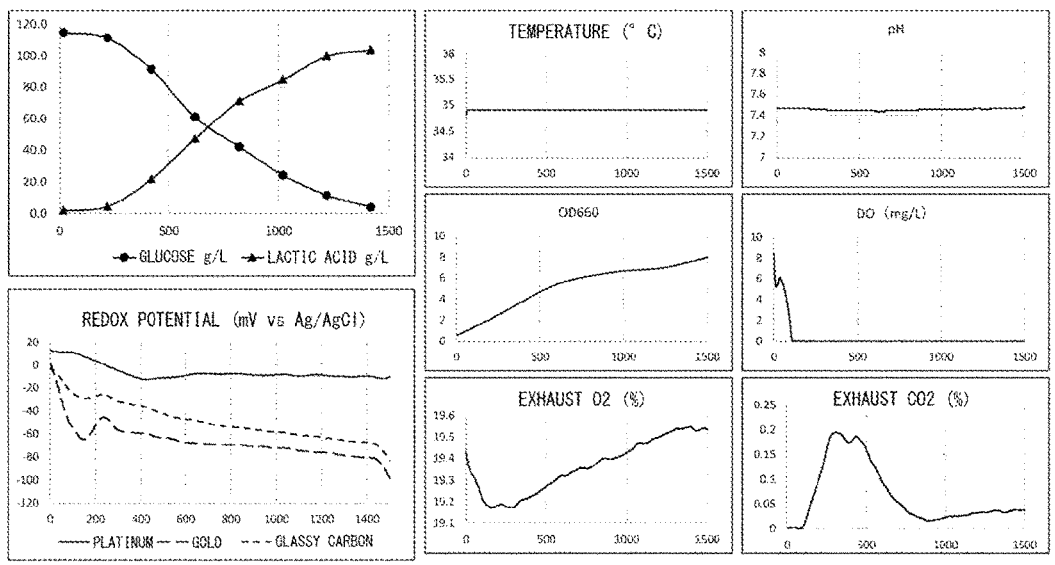

[Fig. 5]
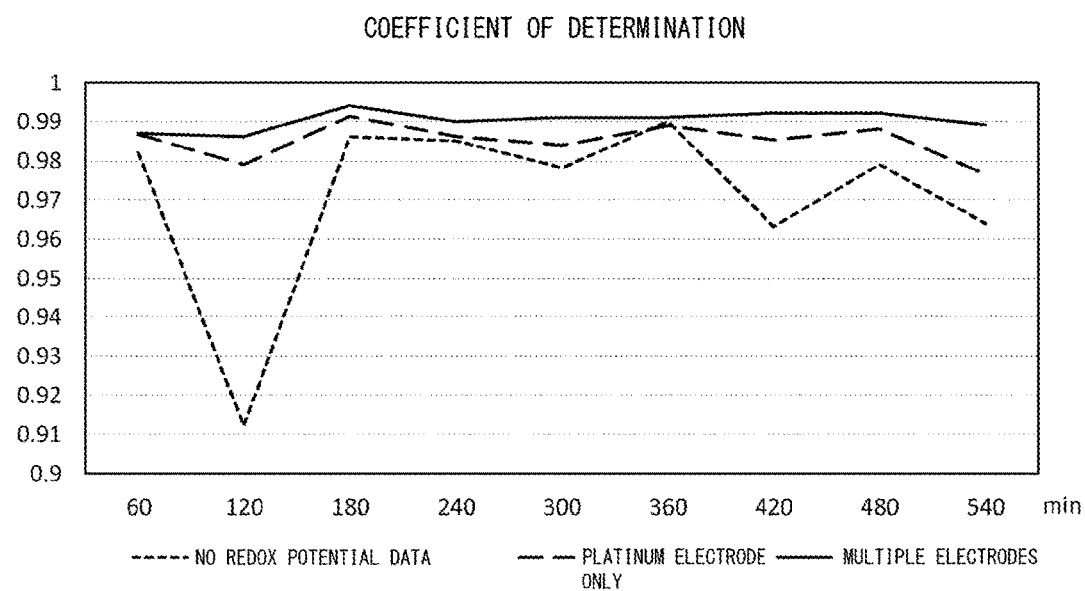

SYSTEM FOR INFERENCE OF MEASUREMENT TARGET DYNAMIC STATE USING REDOX POTENTIAL

TECHNICAL FIELD

One aspect of the invention described herein relates to a system for inference of dynamics of a system to be measured by using redox potentials.

BACKGROUND ART

Japanese Patent Application Publication No. 2007-33344 (PTL 1) describes a redox potential measurement device. In the redox potential measurement device described in PTL 1, for example, a platinum electrode is used as a measurement electrode, and a silver/silver chloride electrode is used as a comparison electrode. Further, PTL 1 describes that any one of various types of comparison electrodes can be used (paragraph [0030]).

For example, for the inference of culture conditions for microorganisms using a redox potential measurement device, at most an index such as whether a culture solution is aerobic or anaerobic could be obtained.

CITATION LIST

Patent Literature

PTL 1 Japanese Patent Application Publication No. 2007-33344

SUMMARY OF INVENTION

Technical Problem

An object of one aspect of the invention described herein is to provide a system for inference of dynamics of a system to be measured, the system being capable of providing not only information as to whether a culture solution is aerobic or anaerobic, but also data for determining a culture operation and for optimizing various conditions for the culture solution.

Solution to Problem

One aspect of the invention described herein is based on the finding that the inference of dynamics of a system to be measured can be performed by basically using a plurality of types of working electrodes (measurement electrodes) to measure the redox potential between each working electrode and a reference electrode.

The first aspect of the invention described herein relates to a system for inference of dynamics of a system to be measured. A system 1 for inference of dynamics of a system to be measured includes a reference electrode 3, a first working electrode 5, a second working electrode 7 that is different at least in material or surface treatment from the first working electrode, a third working electrode 9 that is different at least in material or surface treatment from the first working electrode and the second working electrode, and an information storage unit 11.

The information storage unit 11 is an element for receiving first potential information regarding a redox potential at the reference electrode and the first working electrode, second potential information regarding a redox potential at the reference electrode and the second working electrode, and third potential information regarding a redox potential at the reference electrode and the third working electrode, and storing information including the first potential information, the second potential information, and the third potential information.

The above-mentioned system is a system that can be used to infer dynamics of a system to be measured. Specifically, it can obtain information including the first potential information, the second potential information, and the third potential information for a target (e.g., culture medium) for which various conditions are adjusted, so that it is possible to collect information used to perform analysis of dynamics of a system to be measured. Such data is, for example, multivariate data that can be used for machine learning and the like.

A dynamics inference unit 13 is an element for inferring dynamics of the system as a target by using the first potential information, the second potential information, and the third potential information that are stored in the information storage unit.

A preferred use case for this system is for a system used to infer dynamics of a system containing living organisms and present an optimization method or perform optimization automatically.

Advantageous Effects of Invention

One aspect of the invention described herein can provide not only information as to whether a culture solution is aerobic or anaerobic, but also data for determining a culture operation and for optimizing various conditions for the culture solution.

BRIEF DESCRIPTION OF DRAWINGS

FIG. 1 is a block diagram illustrating a configuration example of a system for inference of dynamics of a system to be measured.

FIG. 2 is a block diagram illustrating a basic configuration of a computer.

FIG. 3 is a schematic view of a culture and measurement system according to an example.

FIG. 4 illustrates graphs, in place of drawings, indicating typical culture results and time-series data of cultures in the example.

FIG. 5 is a graph, in place of a drawing, indicating comparison of a coefficient of determination with a lactic acid production efficiency in the example.

DESCRIPTION OF EMBODIMENTS

Embodiments of the present invention will be described below with reference to the drawings. The present invention is not limited to the embodiments described below, and includes modifications of the following embodiments as appropriate within a scope obvious to those skilled in the art.

FIG. 1 is a block diagram illustrating a configuration example of a system for inference of dynamics of a system to be measured. The dynamics of a system to be measured include an optimization condition for the system to be measured and various fluctuations. Examples of the dynamics of a system to be measured include, for example, the survival conditions, activity conditions, dispersion conditions, proliferation conditions, fermentation status, amount of predetermined metabolites, amount of decomposition products, conditions suitable for a certain purpose, and conditions unsuitable for a certain purpose of the organisms living in a system to be measured.

As illustrated in FIG. 1, a system 1 for inference of dynamics of a system to be measured includes a reference electrode 3, a first working electrode 5, a second working electrode 7, a third working electrode 9, and an information storage unit 11. In this configuration, data for obtaining an optimization condition can be stored in the information storage unit 11. This system 1 may further include a dynamics inference unit 13. The dynamics inference unit 13 can infer the optimization condition by reading the data recorded in the information storage unit 11 and performing various analyses. The second working electrode 7 refers to an electrode that is different at least in material or surface treatment from the first working electrode. The third working electrode 9 refers to an electrode that is different at least in material or surface treatment from the first working electrode and the second working electrode.

The working electrodes 5, 7 and 9 are electrodes that work on a measurement target to measure the redox potential between each working electrode and the reference electrode 3. At least three working electrodes are prepared. The system 1 may include three or more (e.g., four, five, six, or seven) working electrodes. Each of the plurality of working electrodes is preferably insulated. In addition, it is preferable that a voltmeter is provided between each working electrode and the reference electrode 3 to measure the potential difference independently.

The working electrodes may be any electrode as long as it is conductive and can come into contact with an object (typically containing a liquid). Each working electrode is different at least in material or surface treatment from the other electrodes. Examples of materials of the working electrodes include platinum, gold, carbon, carbon allotropes (glassy carbon, diamond, graphene, carbon nanotubes, fullerenes), and alloys. The different material referred to herein includes one with a different composition ratio. The different surface treatment referred to herein includes one with a different electrode surface roughness, different atomic arrangement on the electrode surface, and/or different shape. The shape of each working electrode can be adjusted as appropriate according to the application.

The system 1 for inference of dynamics of a system to be measured is preferably a computer-aided system. This system is basically implemented using a computer (and software). This system is desirably a system that is automatically processed by a computer. Further, in response to an input from a user, this system may be able to process the input as one type of information. Each element or the element represented as a unit herein functions as a means for performing various processing in a computer.

FIG. 2 is a block diagram illustrating a basic configuration of a computer. As illustrated in FIG. 2, the computer includes an input unit 21, an output unit 23, a control unit 25, a computation unit 27, and a storage unit 29, and these elements are connected by a bus 31 or the like so that information can be exchanged therebetween. For example, the storage unit may store a control program and/or various information. When specified information is input from the input unit, the control unit reads a control program stored in the storage unit. Then, the control unit reads information stored in the storage unit as appropriate and transmits it to the computation unit. The control unit also transmits the appropriately input information to the computation unit. The computation unit performs operation processing using various received information and stores the result in the storage unit. The control unit reads the operation result stored in the storage unit and outputs it from the output unit. In this way, various processing is executed. Each unit executes the various corresponding processing.

The information storage unit 11 is an element for receiving first potential information regarding a redox potential at the reference electrode and the first working electrode, second potential information regarding a redox potential at the reference electrode and the second working electrode, and third potential information regarding a redox potential at the reference electrode and the third working electrode, and storing information including the first potential information, the second potential information, and the third potential information.

The storage unit 29 of the computer functions as the information storage unit 11. The voltmeter for each working electrode inputs information on a measured voltage (and thus a redox potential) to the input unit 21 of the computer. In response to this, the computer stores the potential information input to the information storage unit 11.

The above-mentioned system is a system that can be used to infer dynamics of a system. Specifically, it can obtain information including the first potential information, the second potential information, and the third potential information for a target (e.g., culture solution containing organisms) for which various conditions are adjusted, so that it is possible to collect information used to perform analysis of dynamics of a system. Such data is, for example, multivariate data that can be used for machine learning and the like.

A dynamics inference unit 13 is an element for inferring dynamics of the system as a target by using the first potential information, the second potential information, and the third potential information which are stored in the information storage unit.

The above-mentioned system may be configured to further receive measured-system information which is information on a system to be measured, and use the received measured-system information and the above-mentioned first to third potential information to infer the dynamics of the target system. The measured-system information can be obtained by using, for example, various sensors. Examples of the measured-system information include temperature, humidity, atmospheric pressure, turbidity and acidity of culture solution, concentration of a target substance, and presence/absence of a target substance. Further, the above-mentioned system may store system change information which is information on changes in the system (e.g., the amount and concentration of a dropped substance). By using the stored system change information, measured-system information, and first to third potential information, a correlation between the measured-system information and the first to third potential information upon a change in the system can be obtained. Repeating analysis of such correlation makes it possible to infer the dynamics of the system to be measured.

For example, now consider the case where the above-mentioned system infers the dynamics of the turbidity (e.g., OD660) of a target culture solution. In this case, the above-mentioned system receives information on light absorption together with information such as temperature and pH from a spectroscopic analyzer that irradiates the target culture solution with light. At this time, as described above, the system stores such information as well as information including the first potential information, the second potential information, and the third potential information. The system then uses such stored pieces of data as multivariate data to be analyzed to infer the dynamics of the OD660. Further, if the inferred dynamics are undesirable, the dynamics when the pH or temperature is changed can be inferred in the same way. In this way, this system can infer the dynamics of a system to be measured and provide support for optimal culture.

For example, now consider the case where the above-mentioned system infers the dynamics of the concentration of a target product (e.g., lactic acid produced by fermentation). In this case, the above-mentioned system receives quantified data on the lactate concentration in the target culture solution together with information such as the temperature and pH. At this time, as described above, the system stores such information as well as information including the first potential information, the second potential information, and the third potential information. The system then uses the stored pieces of data as multivariate data, and performs machine learning on the data to derive a correlation between the time-series changes in the lactate concentration and the time-series changes in other data. By using this learning unit, the dynamics of the lactate concentration can be inferred from the data that can be obtained during culture. Further, if the inferred dynamics are undesirable, the dynamics when the pH or temperature is changed can be inferred in the same way. In this way, this system can infer the dynamics of a system to be measured and provide support for optimal production.

A preferred use case for this system is for a system used to infer an optimal condition for a system containing living organisms.

Examples of use cases for the system of the present invention will be described below.

Water System Monitoring

It is possible to monitor the multidimensional changes in redox potentials of a water system in accordance with life activities in multiple dimensions. Potential information from the plurality of electrodes in various events is stored and used as multivariate data. By performing machine learning on the multivariate data, various analyses can be performed such as patterning.

Description of Biological Phenomena

Since various trace elements, as well as oxygen, nitrogen, and sulfur, which are known as active molecular species, take various redox states, biological phenomena can be described in more detail in a manner that the multidimensional redox states are measured at a plurality of types of conductor electrode potentials.

Microbial Production

In the process of producing substances by microorganisms, components of raw materials and various components in the culture solution necessary for the vital activities of microorganisms are consumed, and in the process of decomposition and production, the redox state in the culture solution has multivariate changes. Potential information from the plurality of electrodes is stored and used as multivariate data. By performing machine learning on the multivariate data, various analyses can be performed such as patterning. For example, the patterning is performed by machine learning using the potential information when the microorganisms are killed. Then, when the potential information of a new system shows a relationship such as a correlation with the patterned potential information, changing the conditions of the system makes it possible to prevent the microorganisms from being killed.

Beer

The redox state in the fermentation process differs depending on the conditions of the raw materials such as barley, hop, mother water, and brewer's yeast. The redox state also changes by changing the temperature during fermentation, and the resulting beer finish also changes. Monitoring the potential information makes it possible to know the fermentation conditions. For example, the potential information during normal fermentation is stored as data, on which machine learning is performed. Then, when the potential information of a new system is different from any of the machine-learned potential information patterns, it is expected that the conditions for fermentation are not normal and the quality of beer may change. Using a plurality of pieces of potential information as data in this way makes it possible to keep the quality of beverages such as beer constant. Examples of the beverages include wine, sake, alcoholic beverages including whiskey, and fermented beverages (drinking yogurt, etc.).

Fermented Seasoning

Fermented Seasonings Such as Soy Sauce, Miso, Koji, Sweet Sake, and Vinegar

It is possible to manage the temperature and redox state of the raw materials such as soybeans, wheat, rice, koji, and yeast, and product finish.

Organic Wastewater Treatment

Since wastewater treatment involves the complex microbial system, using the potential information makes it possible to know the treatment conditions of organic wastewater.

Antibody Drug

For example, in antibody (protein) production using CHO cells (animal cells), using the potential information makes it possible to produce antibodies with a certain quality.

Regenerative Medicine

Using the proliferation efficiency and differentiation induction efficiency of stem cells and the potential information of differentiation state makes it possible to have a certain level of quality.

Algae

Also for the cultivation of algae, using the potential information makes it possible to have a certain level of quality.

Hydroponics

Relationship between the redox state of a nutrient solution in contact with rhizosphere and the growth of vegetables in hydroponics Paddy Field Also for rice cultivation, using the potential information makes it possible to have a certain level of quality.

Corrosion of Circulating Water System Pipes

Also for circulating water system pipes, using the potential information makes it possible to know their conditions.

Aquaculture

Also for the deterioration of water quality in aquaculture farms, the growth of fish, and the occurrence of diseases, using the potential information makes it possible to manage and optimize them.

Pollution and Purification of Harbors, Waterways, and Lakes

For pollution and purification of harbors, waterways, and lakes, using the potential information makes it possible to know their conditions.

Aquarium

Also for aquarium, using the potential information makes it possible to know its conditions.

Wearable Terminal

For a wearable terminal, obtaining data on the redox state (sweat, etc.) of the surface of a body makes it possible to know the health condition and psychological condition of the wearer.

Oral Sensor

It is possible to analyze the relationship between the redox potential in the mouth and tooth decay, periodontal disease, halitosis, mouth ulcer, and health condition, and the like.

Urine Sensor

Analyzing urine using this system makes it possible to know the health condition of the subject, such as early detection of cancer. Also in this case, for example, pieces of potential information of the urine sensed from a certain cancer patient are stored, machine learning is performed on the pieces of potential information for patterning, and the results are stored. Then, the sensed potential information of the subject's urine is analyzed, so that it is possible to analyze the possibility that the subject has certain types of cancer.

Compost Making

Also for compost, using the potential information makes it possible to know its conditions.

EXAMPLE

An example is illustrated in which the system of the present invention is adapted to lactic acid production by microorganisms.

FIG. 3 is a schematic view of a culture and measurement system according to the example. As illustrated in FIG. 3, a culture control device 41 includes a jar fermenter 42, a stirring impeller 43, an air blowing device 44, an exhaust gas measurement device 45, sampling 46, a heater band 47, a NaOH addition control pump 48, a thermometer 49, a pH meter 50, a dissolved oxygen meter 51, a platinum electrode 52, a gold electrode 53, a glassy carbon electrode 54, a reference electrode 55, a voltage logger 56, and a computer 57.

The strain used produces lactic acid using glucose as a substrate. A medium consisting of glucose and yeast extract was placed in the jar fermenter, pre-cultured bacteria were added thereto, and the culture was performed while aerating air from a sparger.

The redox potential sensor used, which has the working electrodes which are made of platinum, gold, and glassy carbon, respectively and the single common reference electrode which is a silver-silver chloride electrode, was connected to the commercially available voltage logger. The other measurement items are temperature, pH, dissolved oxygen concentration, exhaust oxygen concentration, and exhaust $CO_2$ concentration. The thermometer, pH meter, and dissolved oxygen meter were installed in the jar fermenter. The pH was monitored by a culture control device, and when the pH fell below a set pH, the pump was controlled to drop a NaOH solution to keep the pH constant. The exhaust oxygen concentration and the exhaust $CO_2$ concentration were also measured by the culture control device. Such data were finally recorded in the computer.

Using this culture system, 40 experiments were performed in total under conditions that the initial glucose concentration was 120 g/L, the temperature was in a range of 34.5 to 37.0 degrees Celsius, and the pH was in a range of 7.34 to 8.13. Culture solutions 20, 220, 420, 620, 820, 1020, 1220, and 1420 minutes after inoculation were collected, and their OD660, glucose concentration, and lactic acid concentration were quantified. Spline interpolation was performed from this data to obtain the OD660, glucose concentration, and lactic acid concentration throughout the culture period.

FIG. 4 illustrates graphs, in place of drawings, indicating typical culture results and time-series data of cultures in the example.

Based on such data, a learning model was built using a random forest, in which the temperature, pH, dissolved oxygen concentration, exhaust oxygen concentration, exhaust $CO_2$ concentration, OD660, and redox potential data are used as inputs at each time point: 60, 120, 180, 240, 300, 360, 420, 480, and 540 minutes after inoculation, and lactic acid production efficiencies (lactic acid concentration when the glucose concentration decreased to 20 g/L) were used as outputs. When only the platinum electrode is used for the redox potential data, the coefficient of determination of production efficiency was 0.987, 0.979, 0.991, 0.986, 0.984, 0.989, 0.985, 0.988, and 0.977 (average 0.985) in the order of the elapsed time after inoculation. Note that the coefficient of determination when the redox potential data was not added was 0.982, 0.912, 0.986, 0.985, 0.978, 0.99, 0.963, 0.979, 0.964 (average 0.971) in that order.

Next, as a result of building a learning model by adding the gold electrode and the glassy carbon electrode for the redox potential data, the coefficient of determination of production efficiency was significantly improved in the order of 0.987, 0.986, 0.994, 0.990, 0.991, 0.991, 0.992, 0.992, and 0.989 (average 0.990) (P value=0.0009: Paired t-test).

FIG. 5 is a graph, in place of a drawing, indicating comparison of the coefficient of determination with the lactic acid production efficiency in the example. This indicates that the pieces of redox potential data from the plurality of types of electrodes provided by the present invention are more useful as indexes for inference of the dynamics of the culture system as compared with the conventional redox potential data from one type of electrode.

INDUSTRIAL APPLICABILITY

The present invention, which relates to a system for inference of dynamics of a system to be measured, can be applicable in various technical fields such as an experimental equipment industry, a pharmaceutical industry, and biotechnology.

REFERENCE SIGNS LIST

1 System for inference of dynamics
3 Reference electrode
5 First working electrode
7 Second working electrode
9 Third working electrode
11 Information storage unit
13 dynamics inference unit

The invention claimed is:

1. A system for inference of dynamics of a target to be measured containing a living organism, comprising:
a reference electrode;
a first working electrode;
a second working electrode that is different at least in material or surface treatment from the first working electrode;
a third working electrode that is different at least in material or surface treatment from the first working electrode and the second working electrode;

a voltmeter being provided between the reference electrode and the working electrodes to measure potential differences between the reference electrode and the working electrodes;

an information storage unit configured to receive:
  first potential information regarding a redox potential at the reference electrode and the first working electrode,
  second potential information regarding a redox potential at the reference electrode and the second working electrode, and
  third potential information regarding a redox potential at the reference electrode and the third working electrode, and
  wherein the information storage unit is configured to store information including the first potential information, the second potential information, and the third potential information,
wherein the information storage unit is configured to further receive information of the target, which is the information on the target to be measured,
wherein the information storage unit is configured to store a target change information, which is the information that is measured upon a change in the target; and
a dynamics inference unit comprising a processor and a memory storing a program configured to execute analysis of correlation between the first potential, the second potential or the third potential information and measured-system information, thereby inferring dynamics of the target,
wherein the dynamics inference unit is configured to obtain the stored target change information, the stored target information, the stored first potential information, the stored second potential information, and the stored third potential information from the information storage unit,
wherein the dynamics inference unit repeats continuous analysis of the correlation with the electrodes placed in the target by using the stored target change information, the stored target information, the stored first potential information, the stored second potential information, and the stored third potential information, obtains a correlation between the target information and the first to the third potential information upon the change in the target, and
infers dynamics of the target.

2. The system for inference of dynamics of a target to be measured according to claim 1, wherein the dynamics inference unit infers an optimization condition for the target by using the first potential information, the second potential information, and the third potential information that are stored in the information storage unit.

3. The system for inference of dynamics of a target to be measured according to claim 1, wherein
  the system for inference of dynamics is used for operational support in the target.

4. The system for inference of dynamics of a target to be measured according to claim 1, wherein
  the second working electrode is different in surface treatment from the first working electrode; and
  the third working electrode is different in surface treatment from the first working electrode and the second working electrode.

5. The system for inference of dynamics of a target to be measured according to claim 1, wherein
  the second working electrode that is different at least in surface roughness from the first working electrode;
  the third working electrode that is different at least in surface roughness from the first working electrode and the second working electrode.

6. The system for inference of dynamics of a target to be measured according to claim 1, wherein
  the second working electrode that is different in shape from the first working electrode;
  the third working electrode that is different in shape from the first working electrode and the second working electrode.

7. The system for inference of dynamics of a target to be measured according to claim 1, wherein
  the first working electrode, the second working electrode and the third working electrode are affected by immersed liquid.

8. The system for inference of dynamics of a target to be measured according to claim 1, further comprising a second voltmeter and a third voltmeter, thereby one voltmeter is disposed between the reference electrode and the working electrodes respectively.

9. The system for inference of dynamics of a target to be measured according to claim 1, wherein the first working electrode is a platinum electrode, the second working electrode is a gold electrode, and the third electrode is a glassy carbon electrode.

10. The system for inference of dynamics of a target to be measured according to claim 1, wherein the material of the first, the second and the third electrode are different and selected from the group of platinum, gold, carbon, carbon allotropes and alloys.

* * * * *